United States Patent [19]

Wolfe

[11] 4,000,662
[45] Jan. 4, 1977

[54] MULTIPLE INPUT TRANSMISSION

[75] Inventor: Robert W. Wolfe, Jackson, Mich.

[73] Assignee: Clark Equipment Company, Buchanan, Mich.

[22] Filed: Sept. 5, 1975

[21] Appl. No.: 610,584

[52] U.S. Cl. .................................. 74/331; 74/360; 74/359; 74/15.66; 74/745

[51] Int. Cl.² ..................... F16H 3/08; F16H 3/02; F16H 37/00

[58] Field of Search ............ 74/325, 331, 333, 357, 74/359, 360, 745, 473 R, 15.66

[56] References Cited

UNITED STATES PATENTS

| | | | |
|---|---|---|---|
| 2,316,503 | 4/1943 | Curtis | 74/331 |
| 2,630,718 | 3/1953 | Dickas | 74/325 X |
| 2,753,728 | 7/1956 | Kelbel | 74/359 |
| 2,886,982 | 5/1959 | Thomas | 74/745 |
| 3,163,053 | 12/1964 | Peras | 74/359 |
| 3,173,303 | 3/1965 | Galaniuk | 74/359 X |
| 3,318,167 | 5/1967 | Frost | 74/331 |
| 3,362,244 | 1/1968 | Ivanchich | 74/331 X |
| 3,600,963 | 8/1971 | Portmann | 74/360 |
| 3,757,598 | 9/1973 | Van Dest | 74/473 R |

*Primary Examiner*—Samuel Scott
*Assistant Examiner*—Lance W. Chandler
*Attorney, Agent, or Firm*—Ernst H. Ruf

[57] ABSTRACT

A multiple input and preferably multiple output transmission for industrial, commercial and other vehicles includes axially aligned input and output shafts, a single aligned countershaft, first, second and third input gears, a plurality of foward output gears with one of the forward output gears also being capable of serving as one of the input gears. First, second and third driven countershaft gears are in constant mesh with respective ones of the input gears, and each one of a plurality of driving countershaft gears is in constant mesh with a separate one of the forward output gears, with one of the driving countershaft gears also being capable of serving as one of the driven countershaft gears. Multiple clutch means are utilized for selectively drivably connecting the countershaft with one of the input gears and for selectively drivably connecting the output shaft with the countershaft. A reverse-idler shaft together with its associated gearing provides for a plurality of reverse speeds.

30 Claims, 8 Drawing Figures

I II III = 1ST, 2ND, 3RD INPUTS
i ii iii = 1ST, 2ND, 3RD OUTPUT
F = FWD    R = REV

MULTIPLE INPUT TRANSMISSION

BACKGROUND OF THE INVENTION

1. Field Of The Invention

The field of art to which this invention pertains includes power transmission mechanisms, such as change speed transmission gearing and more specifically transmissions having multiple input and output gears that are particularly adapted for highway type vehicles, such as truck tractors.

2. Description Of The Prior Art

In this time period of decreasing energy supplies and increasing fuel costs, it becomes imperative to increase the efficiency of all vehicles, especially that of commercial and industrial vehicles, such as trucks. One way of accomplishing this goal is to reemphasize the importance of change speed transmissions having multiple input and output gears so as to provide a large number of gear ratios to permit full utilization of the most favorable torque ratio band of the prime mover.

In addition, such transmissions should utilize a minimum number of components, such as gears, shafts and clutches, so as to not only minimize the complexities thereof but also to maximize the reliability thereof. The reduction of the numbers of transmission components also saves considerable weight and space, both of which are important from the energy consumption and efficiency standpoint.

Furthermore, transmissions of this type should be constructed so as to have a minimum number of shafts so as to reduce the number of transmission through-bores to a minimum and additionally, to minimize transmission housing machining costs.

There are prior art transmissions with triple inputs, such as those shown in U.S. Pat. No. 2,316,503 (issued Apr. 13, 1943) to Curtis, however, this transmission utilizes dual countershafts and is markedly more complex in its construction.

SUMMARY OF THE INVENTION

In carrying out this invention, two preferred embodiments thereof have a basic structure which provides axially aligned input and output shafts together with a single aligned countershaft. Thus, the transmission housing has but two through-bores, one for the axially aligned input and output shafts and the second for the single countershaft. First, second and third input gears are affixed to the input shaft, journalled on the input shaft and journalled on the output shaft, respectively. First, second and third countershaft gears are utilized, with the first driven countershaft gear being journalled on the countershaft and the second as well as the third driven countershaft gears being affixed to the countershaft, with these countershaft gears being in constant mesh with respective ones of the input gears. These transmissions further have at least one output shaft gear, including the third input gear, journalled for rotation on the output shaft. In addition, there is at least one driving countershaft gear, including the third driven countershaft gear, affixed to the countershaft and in constant mesh with the at least one output shaft gear. Clutch means are utilized for drivably connecting the at least one output shaft gear to the output shaft, with the first, second and third input gears, by having mutually different pitch circle diameters, permitting three different ratio inputs to the countershaft. Thus, two of the basic features of this invention are the utilization of triple inputs to a single countershaft and the utilization of the third input as one of the forward outputs.

Reverse capability is provided by a reverse shaft parallel with the output shaft. First and second gears are affixed to the reverse shaft, with the first gear being in constant mesh with the at least one driving countershaft gear. A reverse output shaft gear is also journalled on the output shaft and is in constant mesh with the reverse shaft second gear. The previously-recited clutch means includes means for drivably connecting the reverse output shaft gear with the output shaft.

While both transmissions are shown as utilizing three forward outputs and thus each have nine speeds forward, depending on the number of forward outputs, there could be as few as three speeds forward, with the number of forward speeds increasing in multiples of three for each additional forward output.

In one of the preferred embodiments of this invention, all of the gears and clutches are contained within the transmission housing itself, whereas in another preferred embodiment the transmission housing encloses all of the gears and clutches except for the first input and the first driven countershaft gears as well as one of the clutch means. While it may be advantageous to contain all of the transmission gears and clutches within the main transmission housing, in larger transmissions it is important to minimize the unsupported distance or span between the countershaft bearings which can be accomplished by using a separate front casing to enclose the first driven countershaft gear. Either integral or separate input shaft sleeve extensions are utilized, depending on rigidity and assembly requirements.

The principal objects, features and advantages of this invention will be more readily understood by persons skilled in the art when following the detailed description in conjunction with the several drawings.

DESCRIPTION OF THE PREFERRED EMBODIMENTS

Figure 1:
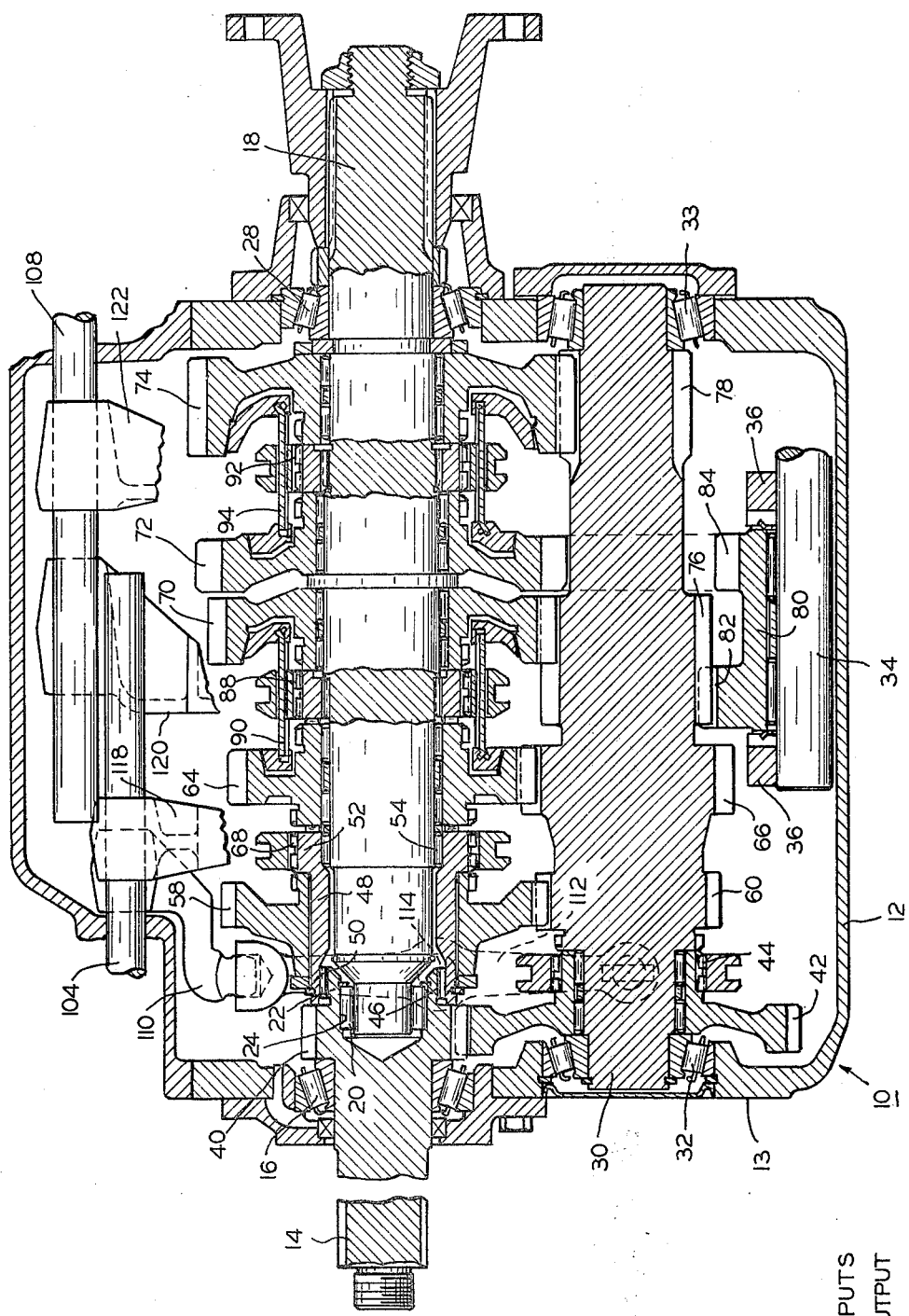
FIG. 1 is a simplified rolled out or developed longitudinal sectional view of a preferred embodiment of this invention.

Referring now to the drawings in detail, the multiple input transmission of this invention, which is denominated generally by the numeral 10, includes a casing or housing 12, an input shaft 14 rotatably journalled in bearing 16 in housing front wall 13, an output shaft 18 axially aligned with input shaft 14 and rotatably journalled at one end in a bearing 20 secured on the inner peripheral surface 24 of input shaft tubular portion 22 and near the other end in bearing 28 in casing 12, and a countershaft 30 parallel to and vertically aligned with output shaft 18, with countershaft or layshaft 30 being rotatably journalled in bearings 32, 33 in casing 12. A dead shaft 34, parallel to countershaft 30, is fixedly retained in aligned bosses or stub walls 36 that are attached to or integral with casing 12, with the actual location of shaft 34 being shown in FIG. 3.

Shaft 14 has a gear 40 affixed thereto or integral therewith adjacent to the inner end of bearing 16, with gear 40 being in constant mesh with a gear 42 rotatably journalled on roller or needle bearings on countershaft 30 adjacent to front bearing 32. A conventional dog clutch 44, incorporating a known clutch lock to prevent jumping out of gear, is disposed on the hub of gear 42 and is arranged either to driveably connect gear 42 to countershaft 30 for conjoint rotation therewith, or to occupy a neutral position as shown in FIG. 1.

Input shaft tubular portion 22, which is adjacent to the inner axial end of gear 40, has affixed thereto, such as by splines 46, one end 50 of a sleeve 48 that coaxially surrounds output shaft 18 near the end thereof mounted in bearing 20, with sleeve 48 forming an extension of the input shaft. The other end 52 of sleeve 48 is rotatably journalled on its inner peripheral surface on needle bearing 54 on output shaft 18.

Rotatably journalled on sleeve 48, between end portions 50 and 52, is a gear 58 that is in constant mesh with a further gear 60 integral with or affixed to countershaft 30. Rotatably journalled on output shaft 18, adjacent to sleeve end 52, is a gear 64 that is in constant mesh with a gear 66 integral with or affixed to countershaft 30. Another conventional dog clutch 68, also incorporating a clutch lock, is disposed on the outer peripheral surface of sleeve portion 52 between gears 58 and 64 and is arranged either to driveably connect gear 58 to sleeve 48, or to driveably connect gear 64 to shaft 18, or to occupy a neutral position as shown in FIG. 1. Thus, basically, it is the function of clutch 68 to connect either of gears 58 and 64 for conjoint rotation with input shaft 14 via sleeve 48. Gears 40, 58 and 64, whose pitch circle diameters differ from one another in a well-known manner, are thus in constant mesh with gears 42, 60 and 66 respectively, with the utilization of clutches 44 and 68 thus providing three separate inputs to single countershaft 30. The portion of transmission 10 described so far may be designated the "input" portion of this transmission.

Also journalled for rotation on output shaft 18, via needle bearings, are gears 70, 72 and 74 whose pitch circle diameters differ from one another in a well-known manner, with gears 70 and 74 being in constant mesh, respectively, with gears 76 and 78 affixed to or integral with countershaft 30. Gear 76, which has a greater axial extent than gear 70, is also in mesh with a gear 82 affixed to or part of a tubular reverse-idler shaft 80 which in turn is journalled for rotation on needle bearings on dead shaft 34. Gear 72 is in constant mesh with a gear 84 which is affixed to or forms a part of shaft 80.

A conventional dog clutch 88, incorporating a clutch lock and a known synchromesh device 90, is disposed on output shaft 18, intermediate gears 64 and 70, and is arranged to driveably connect either of these two gears to shaft 18 or to occupy a neutral position as shown in FIG. 1. A similar conventional dog clutch 92, incorporating a clutch lock and a known synchromesh device 94, is disposed on output shaft 18, intermediate gears 72 and 74, and is arranged to driveably connect either of these gears to shaft 18 or to occupy a neutral position as shown in FIG. 1. Basically, gears 64, 70, 72 and 74 together with gears 66, 76, 82, 84 and 78 may be described as constituting the "output" box portion of transmission 10. It should be noted that gears 64 and 66 function both as input and output gears, as will be explained in more detail as the description progresses.

Figure 3:
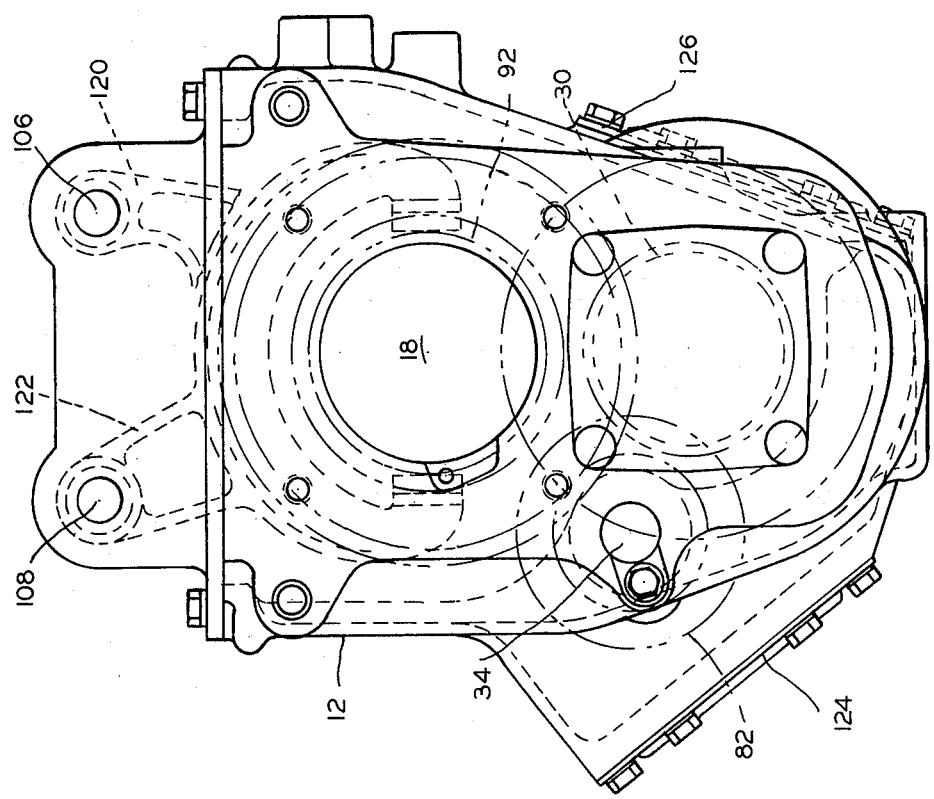
FIG. 3 is a rear end elevation of the embodiment shown in FIG. 1, with both FIGS. 2 and 3 showing the actual locations of the various shafts.
Figure 2:
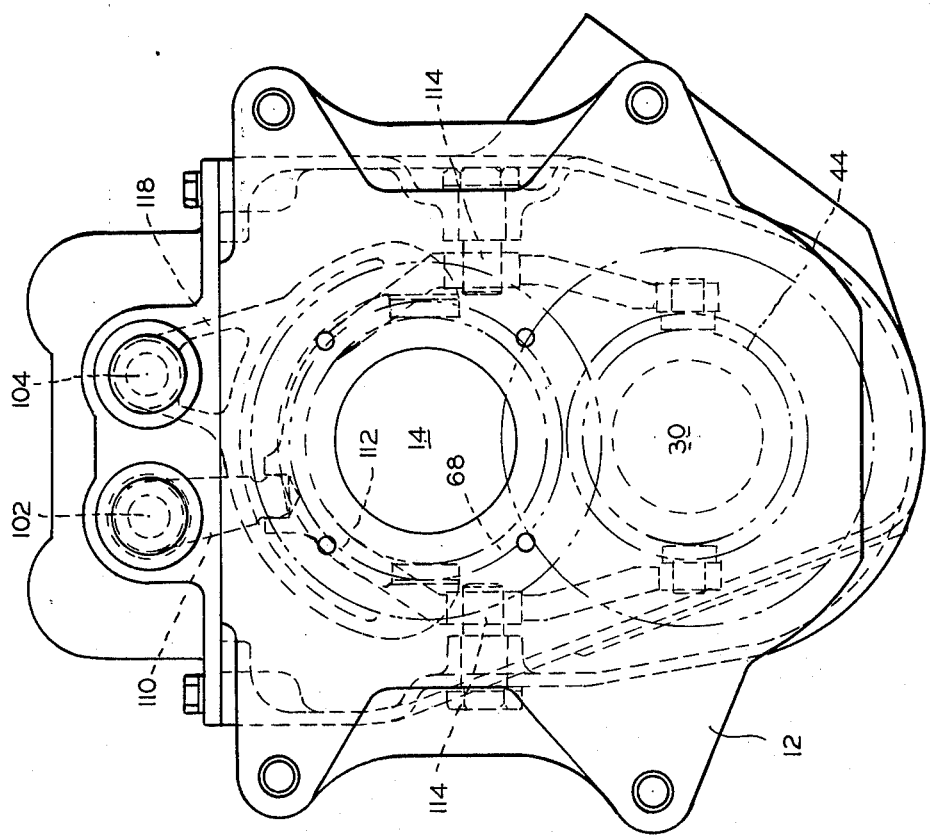
FIG. 2 is a front end elevation of the embodiment shown in FIG. 1.
Figure 4:
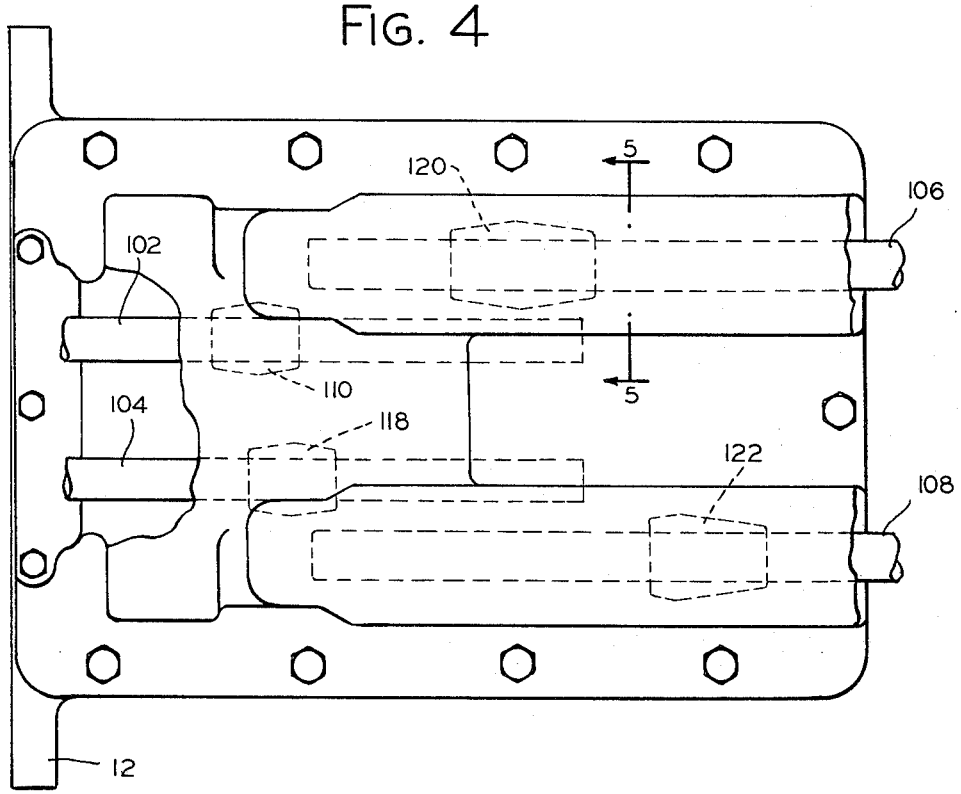
FIG. 4 is a simplified top plan view of the embodiment of FIG. 1.
Figure 5:
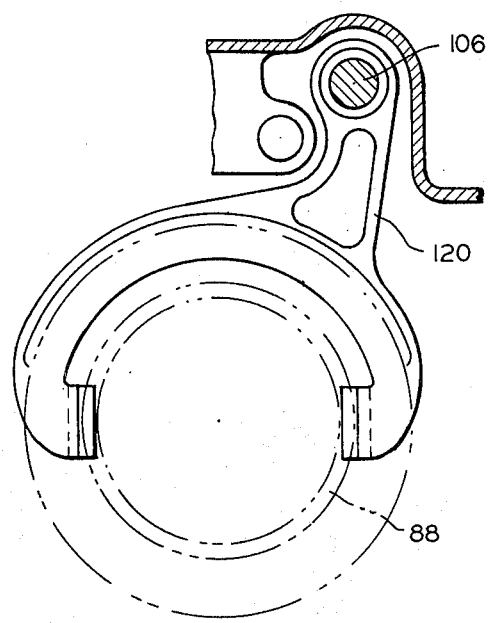
FIG. 5 is a vertical sectional view taken long the line 5—5 of FIG. 4.

Control means for selecting any of the available power paths through the transmission include four shift rails or selector rods 102, 104, 106 and 108 that are best seen in FIGS. 2, 3 and 4. All four of the selector rods are parallel and adjacent to one another and have any desired type of conventional interlock means, not shown. As best seen in FIGS. 1 and 2, shift rail 102 carries a lug member 110 that is pivotally connected with a shift fork 112 which in turn is pivotally connected to casing 12 at 114. Shift fork 112 operatively engages clutch 44 and operates it in the manner previously described. Shift rails 104, 106 and 108 carry respective selector or shift forks 118, 120 and 122 that operatively engage respective clutches 68, 88 and 92. Shift rails 102, 104, 106 and 108 are actuated in any desired or conventional manner either manually or by means of fluid-actuated piston-cylinder units attached thereto (not shown).

Figure 8:
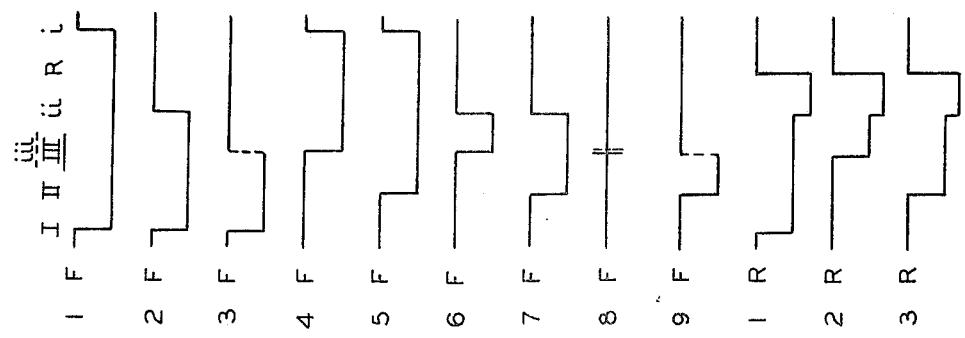
FIG. 8 is a schematic showing of the power paths through the FIG. 1 and FIG. 6 embodiments in each of the forward and reverse speeds.

In operation, in the FIG. 1 embodiment, nine forward speeds and three reverse speeds are available. FIG. 8 is a schematic showing of the various power paths through transmission 10 in each of the forward and reverse speeds. As best seen in FIGS. 1 and 8, transmission 10 can be defined as having a first input via constant mesh gears 40 and 42, the latter being adapted to be coupled to countershaft 30 via clutch 44, with countershaft 30 rotating in a direction opposite to that of input shaft 14. A second input is provided by constantly meshing gears 58 and 60, with the former being adapted to be coupled to input sleeve 48 via one of the operative positions of clutch 68, thereby causing the rotation of countershaft 30 in a direction opposite to that of input shaft 14. Yet another or third input is provided by constantly meshing gears 64 and 66, with the former being adapted to be coupled to input shaft sleeve 48 via the other operative position of clutch 68, thereby rotating countershaft 30 in a direction opposite to that of input shaft 14.

A first forward output from transmission 10 can be defined by constantly meshing gears 78 and 74, with the latter being adapted to be coupled to output shaft 18 via one of the operative positions of clutch 92, thereby rotating output shaft 18 in a direction opposite to that of countershaft 30. A second forward output is defined by constantly meshing gears 76 and 70, with the latter being adapted to be coupled to output shaft 18 via one of the operative positions of clutch 88, thereby rotating output shaft 18 in a direction opposite to that of countershaft 30. Yet another or third forward output is defined by constantly meshing gears 66 and 64, with the latter being adapted to be joined to output shaft 18 via another of the operative positions of clutch 88, thereby rotating output shaft 18 in a direction opposite to that of countershaft 30.

A reverse output is provided by constantly meshing gears 84 and 72, with the latter being adapted to be coupled to output shaft 18 via another of the operative positions of clutch 92, thereby rotating output shaft 18 in the same direction as countershaft 30 (and in a direction opposite to that of input shaft 14).

An analysis of FIG. 8 will show that by utilizing the first input (40, 42) together with the first output (78, 74) provides a first forward speed. Continuing use of the first input but utilizing the second (76, 70) or third (66, 64) outputs will provide second or third forward output speeds. The third input (64, 66) together with the first output provides a fourth forward speed whereas the second input (58, 60) with the first output provides a fifth forward speed. The third input together with the second output provides a sixth forward speed whereas the second input together with the second output provides a seventh forward speed. The third input, which is also the third output, provides an eighth or direct forward drive by utilizing clutch 68 to couple one side of the hub of gear 64 to input shaft sleeve 48 and by utilizing clutch 88 to couple the other side of the hub of gear 64 to output shaft 18. A ninth forward speed is provided by utilizing the second input together with the third output.

Three reverse speeds are available by coupling either the first, second or third inputs to the reverse output (84, 72). While three reverse output speeds are possible, it is of course not necessary that all three of these speeds be utilized.

Another way of defining the structure and function of transmission 10 is, as best seen in FIG. 8, that the first input is utilized in the first, second and third speeds forward as well as the first speed in reverse. The second input is utilized for the fifth, seventh and ninth speeds forward as well as the third speed in reverse. The third input is utilized for the fourth, sixth and eighth speeds forward as well as the second speed in reverse. The first output is utilized for the first, fourth and fifth speeds forward whereas the second output is utilized for the second, sixth and seventh speeds forward. The third output is utilized for the third, eighth and ninth speeds forward while the reverse output is utilized for the first, second and third speeds in reverse.

While transmission 10 has three inputs and three outputs, it should be noted that when changing from first to second, second to third, fourth to fifth, sixth to seventh and eighth to ninth speeds forward, only one clutch has to be disengaged and one other clutch has to be engaged, whereas in shifting from third to fourth, fifth to sixth and seventh to eighth speeds forward, two clutches must be disengaged and two other clutches must be engaged. The shifts between the first, second and third reverse speeds require the disengagement of one clutch and the engagement of one other clutch.

It should be clear from the previous discussion that, although there are nine forward and three reverse speeds, there are only three inputs, three forward outputs and one reverse output, with the third input also being the third forward output, which means that not only are the gears used more than once but in one instance the same gears are used both for input and output purposes. Thus, nine forward and three reverse speeds can be attained in a transmission that utilizes but five shafts (input, output, single countershaft, dead, and reverse-idler), four clutches and only 13 gears. This relatively small number of parts results in a compact, lightweight and efficient transmission.

As best seen in FIG. 3, transmission case or housing 12 is provided with two generally opposed side cover plates 124, 126 that are bolted to housing 12 and removable therefrom to permit the installation of external power takeoff mechanisms (not shown) if so desired. Once side plates 124 and 126 are removed, the housing openings conform to SAE standard bolt pattern J704a which defines side openings for truck power takeoffs. The removal of cover plate 124 permits the installation of a power takeoff unit which includes a gear that can mesh with idler shaft gear 82, whereas the removal of cover plate 126 permits the installation of a power takeoff unit which has a gear that can mesh with countershaft gear 66. Since transmission 10 has three inputs, three power takeoff speeds are possible.

Figure 6:
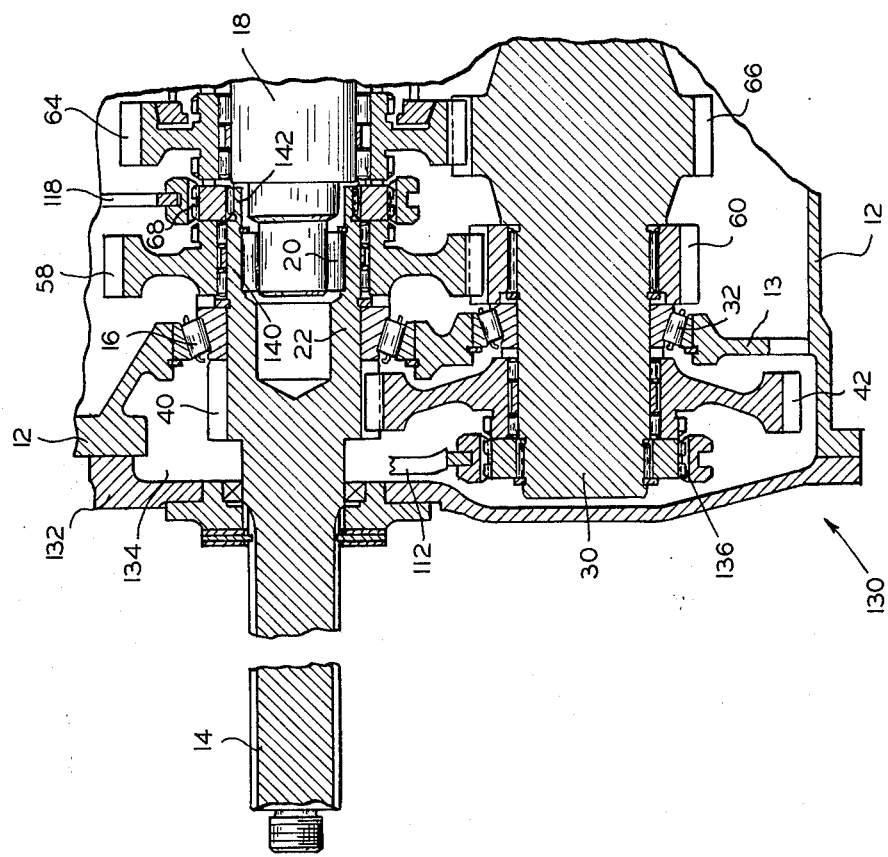
FIG. 6 is a fragmentary rolled out longitudinal sectional view of a modification of the invention of FIG. 1.
Figure 7:
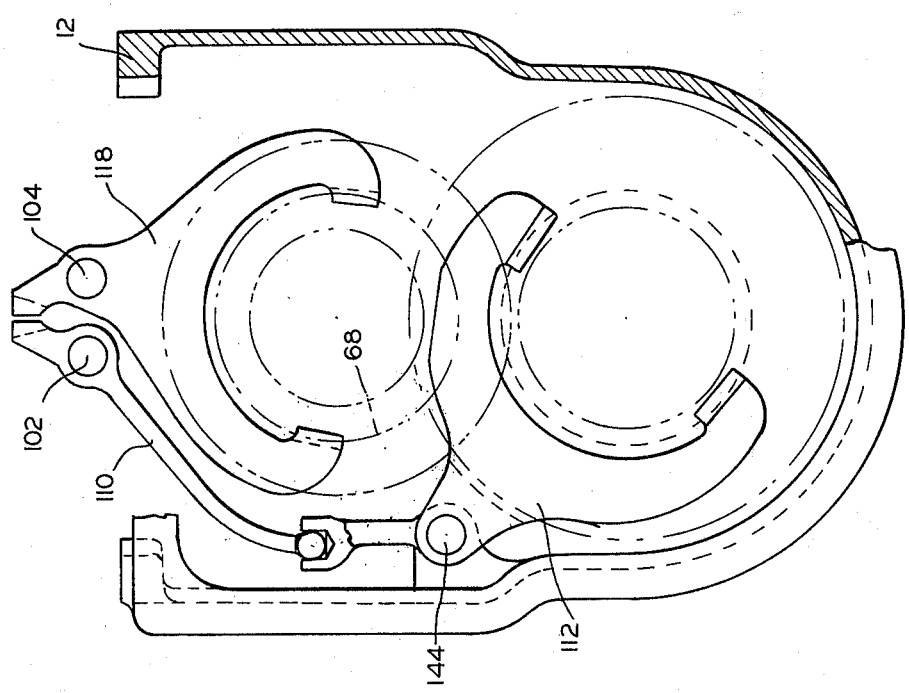
FIG. 7 is a simplified front end elevation, partially in section, of the transmission shown in FIG. 6.

Reference is now made to FIGS. 6 and 7, with FIG. 6 being a simplified fragmentary rolled out longitudinal view of a modification of the invention in FIG. 1. The multiple input transmission shown in FIG. 6, which is denominated generally by the numeral 130, is similar to that of FIG. 1, and to the extent that transmission 130 is the same as previously described transmission 10, reference is made here to this preceding description, with like reference numerals being applied to like parts.

Similar to transmission 10, transmission 130 also has a main casing or housing 12 and in addition thereto also has a removable front casing section 132 secured thereto, with input shaft 14 extending into housing 12 through removable front section 132 and beig journalled in bearing 16 in housing front wall 13. Contrary to the FIG. 1 structure wherein input shaft gear 40 is located adjacent to the inner end of bearing 16, i.e., totally within housing 12, gear 40 in transmission 130 is located adjacent to the outer end of bearing 16, i.e., outside of housing 12, with gear 40 thus being located in the cavity 134 defined by housing front wall 13 and removable front section 132. Consequently, and again different from transmission 10, bearing 16 in transmission 130 is located intermediate gears 40 and 58. While the front portion of countershaft 30 is still journalled in bearing 32 in housing front wall 13, bearing 32 is located intermediate gears 42 and 60, with gear 42 and a clutch 136 thus being located in cavity 134. Clutch 136, which is another conventional dog clutch that also incorporates a clutch lock, is disposed on countershaft 30 (rather than on the hub of gear 42 as in transmission 10 in FIG. 1) and is arranged either to driveably connect gear 42 to countershaft 30 for conjoint rotation therewith, or to occupy a neutral position as shown in FIG. 6. Similar to transmission 10 in FIG. 1, further gears 60 and 66 are integral with or affixed to countershaft 30.

Another distinguishing feature between transmissions 10 and 130 is that while transmission 10 has a separate sleeve 48 affixed thereto, such as by splines 46, input shaft 14 in transmission 130 has a tubular hub or integral sleeve portion 140 that coaxially surrounds output shaft 18 near the end thereof mounted in bearing 20. Rotatably journalled on integral sleeve portion 140 is gear 58 which is in constant mesh with countershaft gear 60. Rotatably journalled on output shaft 18, adjacent to integral sleeve outer end portion 142, is gear 64 that is in constant mesh with countershaft gear 66. Similar to transmission 10, conventional dog clutch 68, also incorporating a clutch lock, is disposed on the outer peripheral surface of integral sleeve outer end portion 142 between gears 58 and 64 and is arranged either to driveably connect gear 58 to integral input shaft sleeve portion 140, or to driveably connect gear 64 to shaft 18, or to occupy a neutral position as shown in FIG. 6. Thus, basically, it is the function of clutch 68 to connect either of gears 58 and 64 for conjoint rotation with input shaft 14 via integral shaft sleeve portion 140. As previously noted, gears 40, 58 and 64, whose pitch circle diameters differ from one another in a well-known manner, are thus in constant mesh with gears 42, 60 and 66 respectively, with the utilization of clutches 136 and 68 thus providing three separate inputs to single countershaft 30. The just-described portion of transmission 130 may be designated the "input" portion of this transmission, with the output portion thereof being substantially similar to that of previously described transmission 10 and will thus not be repeated here.

Control means for selecting either of clutches 68 and 136 include shift rails or selector rods 102, 104 (FIG. 7). Shift rail 104 carries shift fork 118 that operatively engages clutch 68. Shift rail 102 carries a lug member 110 that is pivotally connected with one end of shift fork 112 which in turn is axially slidable on a further rail member 144 connected to casing 12. Shift rails 102 and 104 may be provided with any desired type of conventional interlock means, not shown, and are actuated in any desired or conventional manner, either manually or by means of power units attached thereto (not shown).

In operation, assuming that the "output" portion of transmission 130 is the same as that of transmission 10, then nine forward and three revese speeds are available. The power paths through transmission 130 are substantially similar to those of transmission 10 as shown in FIG. 8.

The basic difference between transmission 10 and 130 is that in the former all of the transmission components, except for protruding outer portions of the input and output shafts, are located wholly within housing 12, whereas in the latter the first input (40, 42) is located in cavity 134 defined by housing 12 and removable front section 132. Consequently, in transmission 130, input shaft bearing 16 and countershaft front bearing 32 are interposed between gears 40, 58 and 42, 60, respectively. Furthermore, while transmission 10 utilizes a separate shaft sleeve 48, transmission 130 utilizes integral unit shaft sleeve 140. The interposition, in transmission 130, of countershaft front bearing 32 between gears 40 and 60 permits a reduction in the unsupported distance or span between countershaft bearings 32 and 33, thus making the structure more rigid. Furthermore, the interposition of input shaft bearing 16 between gears 40 and 58 also makes the input shaft structure more rigid. On the other hand, it is advantageous to contain all of the transmission components within the transmission housing 12 as is the case in transmission 10. The use of a separate sleeve 48 of course necessitates the use of an additional support bearing, namely needle bearing 54 between sleeve end 52 and output shaft 18.

It should be understood that while clutches 44, 68 and 136 are described as conventional dog clutches, they could also incorporate any conventional synchromesh device, if so desired, so that the transmission input portion is also fully synchronized. Conversely, depending on the use of transmissions 10 and 130, the output portion of these transmissions could, if so desired, utilize clutches 88 and 92 that do not incorporate known synchromesh devices 90 and 94, respectively.

It should be understood from the previous discussion that one of the basic features of this invention is the utilization of triple inputs to a single countershaft wherein the third input doubles as one of the forward outputs. This structure in itself provides a three speed forward transmission as exemplified by the third, eighth and ninth speeds forward in each of transmissions 10 and 130. Each additional forward output will provide three more output speeds, one for each of the three inputs. While transmissions 10 and 130 each utilize three forward outputs and thus each have nine speeds forward, depending on the number of forward outputs there could be as few as three speeds forward and increase in multiples of three for each additional forward output.

An analysis of FIG. 8 will show that the eighth speed forward is direct drive whereas the ninth speed forward is an overdrive since the pitch circle diameter of output gear 64 is less than that of input gear 58.

Transmissions 10 and 130, as shown, are particularly adapted for highway type vehicles, such as truck tractors, which spend the majority of their running time at or near maximum highway speeds. For this use, the low gear or first input is rather widely spaced from the second and third inputs, which are relatively close in size, and thus operate as splitters for the output steps in that in highway vehicles it is desirable to have a large number of close ratios at the top end.

A review of FIGS. 1 and 6 will show that, since the pitch circle diameter of second input drive gear 58 is larger than that of third input drive gear 64, both transmissions 10 and 130 have an overdrive ratio in the top or ninth speed forward in which the second input (58, 60) is coupled to the third output (66, 64), with the latter of course also serving as the third input (64, 66). If so desired, the third input drive gear 64 could have the larger pitch circle diameter and the gear ratios could be so chosen that it is the top gear that provides direct drive rather than the next to the top (or eighth) gear, as is the case in transmissions 10 and 130. Thus, depending on the use to which these transmissions are put, the top forward gear ratio may be selected either for direct drive or for overdrive. Furthermore, the steps between the inputs may be selected either to have a large number of ratios at low speed, a large number of ratios at high speed or the steps could be arranged geometrically.

It should be understood that the multiple use of most of the thirteen gears of this transmission together with the triple input feature and the single countershaft permits the utilization of a transmission housing that has but two through bores (one for the axially aligned input and output shafts and another for the vertically displaced countershaft). In the case of transmission 10, all the components for a nine speed forward and three speed reverse transmission can be located completely within a standard five speed forward one speed reverse transmission housing.

It should also be understood that while transmissions 10 and 130 are shown as having constant mesh gearing, this is not mandatory and axially slidable gears could also be utilized. Furthermore, even if constant mesh gearing is utilized, either one of a pair of meshing gears could be journalled on its respective shaft.

From the foregoing, it is believed that those familiar with the art will readily recognize and appreciate the novel concepts and features of the present invention. Obviously, while the invention has been described in relation to only a limited number of embodiments, numerous variations, changes and substitutions of equivalents will present themselves to persons skilled in the art and may be made without necessarily departing from the scope and principles of this invention. As a result, the embodiments described herein are subject to various modifications, changes and the like, without departing from the scope and spirit of the invention. Consequently, the scope of this invention should be determined solely by reference to the claims appended thereto.

What is claimed is:

1. A multiple input transmission comprising:
   a. a transmission housing;
   b. a power input shaft having a tubular extension;
   c. a power output shaft axially aligned with said input shaft;
   d. a countershaft parallel to said output shaft;
   e. a first input gear affixed to said input shaft;
   f. a second input gear journalled for rotation on said tubular extension;
   g. a third input gear journalled for rotation on said output shaft;
   h. clutch means for drivably connecting said second input gear to said input shaft and, alternatively, for drivably connecting said third input gear to said input shaft;
   i. a first driven gear journalled for rotation on said countershaft and in constant mesh with said first input gear;
   j. clutch means for drivably connecting said first driven gear to said countershaft;
   k. a second driven gear affixed to said countershaft and in constant mesh with said second input gear;
   l. a third driven gear affixed to said countershaft and in constant mesh with said third input gear;
   m. at least one output shaft gear journalled for rotation on said output shaft;
   n. at least one driving gear affixed to said countershaft and in constant mesh with said at least one output shaft gear; and
   o. at least one clutch means for drivably connecting said at least one output shaft gear to said output shaft, said first, second and third input gears, by having mutually different pitch circle diameters, permitting three different ratio inputs to said countershaft.

2. The multiple input transmission of claim 1 further including:
   a. a reverse-idler shaft parallel to said aforementioned shafts;
   b. a first gear affixed to said reverse-idler shaft and in constant mesh with said at least one driving gear;
   c. a second gear affixed to said reverse-idler shaft;
   d. a reverse output shaft gear journalled for rotation on said output shaft and in constant mesh with said second reverse-idler gear; and
   e. said at least one clutch means including first clutch means for drivably connecting said reverse output shaft gear to said output shaft.

3. The multiple input transmission of claim 2 wherein:
   a. said at least one output shaft gear includes a first output shaft gear journalled for rotation on said output shaft;
   b. said at least on clutch means includes said first clutch means which can also alternately drivably connect said first output shaft gear to said output shaft; and
   c. said at least one driving gear includes a first driving gear affixed to said countershaft and in constant mesh with said first output shaft gear.

4. The multiple input transmission of claim 3 wherein:
   a. said at least one output shaft gear further includes a second output shaft gear journalled for rotation on said output shaft;
   b. said at least one clutch means further includes second clutch means for drivably connecting said second output shaft gear to said output shaft; and
   c. said at least one driving gear further includes a second driving gear affixed to said countershaft and in constant mesh with said second output shaft gear.

5. The multiple input transmission of claim 4 wherein:
   a. said at least one output shaft gear is said third input gear which can also function as a third output shaft gear;
   b. said at least one clutch means includes said second clutch means which can also alternately drivably connect said third output shaft gear to said output shaft; and
   c. said at least one driving gear is said third driven gear which can also function as a third driving gear.

6. The multiple input transmission of claim 1 wherein said transmission housing has but two transmission housing through-bores, one for said axially aligned input and output shafts and another for said parallel countershaft.

7. The multiple input transmission of claim 1 wherein one end of said tubular input shaft extension is drivingly interconnected with said input shaft and the other end thereof is journalled relative to said output shaft.

8. The multiple input transmission of claim 7 wherein said input shaft is journalled by a bearing in a front wall of said transmission housing, said bearing being located in front of said first input gear.

9. The multiple input transmission of claim 1 wherein said tubular input shaft extension is integral with said input shaft and said input shaft is journalled solely by a single bearing in a front wall of said transmission housing, said bearing being interposed between said first and second input gears.

10. The multiple input transmission of claim 1 wherein all of said transmission shafts, gears and clutches, except for protruding outer portions of said input and output shafts, are located wholly within said transmission housing.

11. The multiple input transmission of claim 1 wherein the pitch circle diameters of said second and third input gears and of said second and third driven gears are such that these four gears provide an overdrive.

12. The multiple input transmission of claim 1 wherein said transmission housing includes a removably attached side cover plate whose removal permits the attachment of an external power takeoff mechanism having a driven gear meshable with said third driven gear.

13. The multiple input transmission of claim 2 wherein said transmission housing includes a removably attached side cover plate whose removal permits the attachment of an external power takeoff mechanism having a driven gear meshable with said first gear affixed to said reverse-idler shaft.

14. The multiple input transmission of claim 1 wherein said at least one clutch means for drivably connecting said at least one output shaft gear to said output shaft includes a synchromesh device.

15. A triple input reversible power transmission comprising:
   a. axially aligned power input and output shafts;
   b. a countershaft aligned with said aforesaid shafts;
   c. a reverse shaft parallel with said countershaft;
   d. a first input gear rigid with said input shaft;
   e. a second input gear journalled on said input shaft;
   f. a third input gear journalled on said output shaft;
   g. first, second, third and fourth output gears jouralled on said output shaft; with one of said output gears alternately functioning as said third input gear;
   h. a first driven gear journalled on said countershaft and in constant mesh with said first input gear;
   i. second and third driven gears rigid with said countershaft and in constant mesh with said second and third input gears, respectively;
   j. first, second and third driving gears rigid with said countershaft and in constant mesh with said first, second and third output gears, respectively, with one of said driving gears alternately functioning as said third driven gear;
   k. first and second reverse shaft gears rigid with said reverse shaft, with said first and second reverse shaft gears being in constant mesh with said second driving gear and said fourth output gear, respectively;
   l. first clutch means for drivably connecting said first driven gear to said countershaft;
   m. second clutch means for drivably connecting said second input gear to said input shaft and, alternatively, for drivably connecting said third input gear to said input shaft;
   n. additional clutch means for drivably connecting said first, second, third and fourth output gears to said output shaft; and
   o. control means for said aforesaid clutch means, operable for selecting any of the available power paths through said transmission.

16. The triple input transmission of claim 15 wherein:
   a. said one of said output gears which alternately functions as said third input gear is said third output gear; and
   b. said one of said driving gears which alternately functions as said third driven gear is said third driving gear.

17. The triple input transmission of claim 16 wherein said additional clutch means includes:
   a. third clutch means for drivably connecting said third output gear to said output shaft and, alternatively, for drivably connecting said second output gear to said output shaft; and
   b. fourth clutch means for drivably connecting said first output gear to said output shaft and, alternatively, for drivably connecting said fourth output gear to said output shaft.

18. The triple input transmission of claim 17 wherein at least one said third and fourth clutch means includes a synchromesh device.

19. The triple input transmission of claim 15 wherein the pitch circle diameter of said second input gear is greater than the pitch circle diameter of said third input gear.

20. The triple input transmission of claim 15 further including a transmission housing, with all of said gears and clutches being contained within said transmission housing.

21. The triple input transmission of claim 15 further including:
   a. a transmission housing for enclosing all of said gears and clutches except for said first input and first driven gears as well as said first clutch means; and
   b. a casing section removably secured to said transmission housing and enclosing said first input and first driven gears as well as said first clutch means.

22. The triple input transmission of claim 21 wherein said input shaft is journalled solely by a single bearing in the front wall of said transmission housing.

23. The triple input transmission of claim 15 wherein said second input gear is journalled on a tubular extension of said input shaft, said tubular extension being nonrotatably coupled on one end thereof with said input shaft and rotatably journalled on said output shaft on the other end thereof.

24. The triple input transmission of claim 23 further including a transmission housing, with said input shaft also being journalled by a bearing in the front wall of said transmission housing, said bearing being located in front of said first input gear.

25. A multiple input power transmission having multiple forward and reverse speeds, said transmission including:
   a. a transmission housing;
   b. axially aligned input and output shafts;
   c. a single countershaft aligned relative to said aforesaid shafts;
   d. first, second and third input gears, affixed to said input shaft, journalled on said input shaft and journalled on said output shaft, respectively;
   e. a plurality of forward output gears journalled on said output shaft, with one of said forward output gears also being capable of serving as one of said input gears;
   f. first, second and third driven countershaft gears, said first driven countershaft gear being journalled on said countershaft and said second and third driven countershaft gears being affixed to said countershaft, said driven countershaft gears being in constant mesh with respective ones of said input gears;
   g. a plurality of driving countershaft gears rigid with said countershaft, with each of said driving countershaft gears being in constant mesh with a separate one of said forward output gears, with one of said driving countershaft gears also being capable of serving as one of said driven countershaft gears;
   h. multiple clutch means for selectively drivably connecting one of said journalled second and third input and first driven countershaft gears to its respective shaft and for selectively drivably connecting one of said forward output gears to said output shaft; and
   i. control means for said clutch means for selecting any one of said available power paths through said transmission.

26. The multiple input power transmission of claim 25 further including:
   a. a reverse shaft parallel with said aforementioned shafts;

b. first and second gears affixed to said reverse shaft, with said reverse shaft first gear being in constant mesh with one of said plurality of driving countershaft gears;

c. a reverse output gear journalled on said output shaft and in constant mesh with said reverse shaft second gear; and d. said clutch means including means for drivably connecting said reverse output shaft gear with said output shaft.

27. The multiple input power transmission of claim 25 wherein:

a. said plurality of forward output gears includes first, seond and third forward output gears; and b. said plurality of driving countershaft gears includes first, second and third driving countershaft gears, each in constant mesh with its respective forward output gear.

28. The multiple input power transmission of claim 27 wherein the pitch circle diameter of said aforementioned gears are such that:

a. said first input gear is utilized for first, second and third speeds forward;

b. said second input gear is utilized for fifth, seventh and ninth speeds forward;

c. said third input gear is utilized for fourth, sixth and eighth speeds forward;

d. said first forward output gear is utilized for first, fourth and fifth speeds;

e. said second forward output gear is utilized for second, sixth and seventh speeds; and f. said third forward output gear is utilized for third, eighth and ninth speeds.

29. The multiple input power transmission of claim 25 wherein said transmission housing has but two transmission housing through-bores, one for said axially aligned input and output shafts and another for said aligned single countershaft.

30. A multiple input and output power transmission comprising:

a. axially aligned input and output shafts;

b. a single countershaft aligned with said output shaft;

c. first, second and third input gears, said third input gear being journalled on said output shaft;

d. first, second and third driven countershaft gears in constant mesh with respective ones of said input gears, said third driven countershaft gear being affixed to said countershaft; with at least two of said first and second input and said first and second driven countershaft gears being journalled relative to said input shaft and countershaft respectively and any remaining ones of said aforesaid gears being affixed relative said input shaft and countershaft;

e. a plurality of output shaft gears, with one of said output shaft gears also being capable of serving as one of said input gears;

f. a plurality of driving countershaft gears, with each of said driving countershaft gears being intermeshable with a separate one of said output shaft gears, with one of said driving countershaft gears also being capable of serving as one of said driven countershaft gears; with at least one gear of each pair of intermeshable output shaft gears and driving countershaft gears being journalled relative to its respective shaft and any remaining gears of said pairs of intermeshable gears being affixed relative to their respective shafts; and g. multiple clutch means for selectively drivably connecting one of said driven countershaft gears with one of said input gears and selectively drivably connecting one of said output shaft gears with said driving countershaft gears.

* * * * *